(12) United States Patent
Patil

(10) Patent No.: US 9,311,328 B2
(45) Date of Patent: Apr. 12, 2016

(54) REFERENCE VOLUME FOR INITIAL SYNCHRONIZATION OF A REPLICATED VOLUME GROUP

(75) Inventor: Roshni Jaywantsingh Patil, Maharashtra (IN)

(73) Assignee: Veritas US IP Holdings LLC, Mountain View, CA (US)

( * ) Notice: Subject to any disclaimer, the term of this patent is extended or adjusted under 35 U.S.C. 154(b) by 386 days.

(21) Appl. No.: 13/092,394

(22) Filed: Apr. 22, 2011

(65) Prior Publication Data

US 2012/0271797 A1 Oct. 25, 2012

(51) Int. Cl.
*G06F 7/00* (2006.01)
*G06F 17/30* (2006.01)

(52) U.S. Cl.
CPC .............................. *G06F 17/30197* (2013.01)

(58) Field of Classification Search
CPC ................................................. G06F 17/30197
See application file for complete search history.

(56) References Cited

U.S. PATENT DOCUMENTS

| | | | | |
|---|---|---|---|---|
| 6,907,505 | B2 * | 6/2005 | Cochran | G06F 3/0617 707/999.201 |
| 7,072,916 | B1 * | 7/2006 | Lewis | G06F 11/14 |
| 7,194,487 | B1 * | 3/2007 | Kekre et al. | |
| 7,941,470 | B2 * | 5/2011 | Le | G06F 3/0607 708/280 |
| 2010/0107113 | A1 * | 4/2010 | Innes et al. | 715/779 |
| 2010/0262586 | A1 * | 10/2010 | Rosikiewicz et al. | 707/679 |
| 2011/0099342 | A1 * | 4/2011 | Ozdemir | 711/162 |
| 2011/0145497 | A1 * | 6/2011 | Bish et al. | 711/113 |
| 2012/0084445 | A1 * | 4/2012 | Brock et al. | 709/226 |
| 2012/0240110 | A1 * | 9/2012 | Breitgand et al. | 718/1 |
| 2012/0243795 | A1 * | 9/2012 | Head et al. | 382/218 |

OTHER PUBLICATIONS

Hansen et al., "Lithium: virtual machine storage for the cloud", Proceedings of the 1st ACM symposium on Cloud computing (SoCC '10), pp. 15-26, ACM, 2010.*

* cited by examiner

*Primary Examiner* — Michael Hicks
(74) *Attorney, Agent, or Firm* — Wilmer Cutler Pickering Hale and Dorr LLP

(57) ABSTRACT

A method for using a reference volume for initial synchronization of a replicated volume group. The method includes initiating a replication and synchronization operation between a parent virtual machine and a child virtual machine, and specifying a parent virtual machine to be used for replication and a subsequent synchronization. The method further includes accessing a point in time snapshot of the parent virtual machine, coordinating with a secondary site to obtain an image of the parent reference volume at said point in time, and copying the common regions from a parent reference volume to a new volume. The differences between the parent reference volume and the new volume are transmitted and are applied to the new volume to synchronize the child virtual machine on the secondary site to the child virtual machine on the primary site, wherein the child and the parent may be in different virtual machine groups.

20 Claims, 10 Drawing Sheets

(12) United States Patent
US 9,311,328 B2

REFERENCE VOLUME FOR INITIAL SYNCHRONIZATION OF A REPLICATED VOLUME GROUP

FIELD OF THE INVENTION

The present invention is generally related to digital computer systems.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Companies have come to rely upon high-availability clusters to provide the most critical services and to store their most critical data. In general, there are different types of clusters, such as, for example, compute clusters, storage clusters, scalable clusters, and the like. High-availability clusters (also known as HA Clusters or Failover Clusters) are computer clusters that are implemented primarily for the purpose of providing high availability of services which the cluster provides. They operate by having redundant computers or nodes which are then used to provide service when system components fail. Normally, if a server with a particular application crashes, the application will be unavailable until someone fixes the crashed server. HA clustering remedies this situation by detecting hardware/software faults, and immediately restarting the application on another system without requiring administrative intervention, a process known as Failover. As part of this process, clustering software may configure the node before starting the application on it. For example, appropriate file systems may need to be imported and mounted, network hardware may have to be configured, and some supporting applications may need to be running as well.

HA clustering and failover clustering are commonly used to implement highly scalable cloud environments. In a cloud environment, multiple virtual machines may be cloned, provisioned and replicated to a remote cloud along with the application data. Virtual machines cloned from the parent will have substantial common data between the two and multiple such virtual machines that belong to different replication volume groups (RVG) may be replicated to the same remote site. Replicating common blocks will increase the initial synchronization time and utilize additional network bandwidth.

SUMMARY OF THE INVENTION

In one embodiment, the present invention comprises a computer implemented method for using a reference volume for initial synchronization of a replicated volume. The method includes initiating a replication and synchronization operation between a reference volume, on which a parent virtual machine is mounted and a new volume, on which child virtual machine is mounted, specifying a reference volume, on which the parent virtual machine is mounted to be used for replication and synchronization, and accessing a point in time snapshot of the reference volume, on which the parent virtual machine is mounted. The method further includes coordinating with a secondary site to obtain an image of the reference volume, on which the parent virtual machine is mounted, at said point in time, and copying the common regions from a reference volume to a new volume on the secondary site. The differences between the reference volume and the new volume are transmitted from a primary site to a secondary site. The differences are then applied to the new volume to synchronize the child virtual machine on the secondary site to the child virtual machine on the primary site, wherein the child virtual machine and the parent virtual machine may be in different replicated volume groups.

In one embodiment, a first cluster is executing at the primary site and a second cluster is executing at the secondary site.

In one embodiment, metadata is used to identify the set of data objects from the replication source that have been modified.

In one embodiment, the metadata comprises changed block address ranges between the reference volume, on which the parent virtual machine is mounted, and the new volume, on which the child virtual machine is mounted, on the primary site.

In one embodiment, a hash process is used to identify common data objects between the point in time snapshot of the reference volume and the new volume.

In one embodiment, the reference volume, on which the parent virtual machine is mounted, is part of a first replicated volume group and the new volume, on which the child virtual machine is mounted, is part of a second replicated volume group.

In one embodiment, the replication and synchronization operation is initiated when a new volume, on which a child virtual machine is mounted, is configured to be replicated to the replicated site where the reference volume, on which the parent virtual machine is mounted, is already replicated.

In one embodiment, the present invention is implemented as computer readable storage medium having stored thereon, computer executable instructions that, if executed by a computer system cause the computer system to perform method for using a reference volume for initial synchronization of a replicated volume. The method includes initiating a replication and synchronization operation between a reference volume, on which a parent virtual machine is mounted and a new volume, on which child virtual machine is mounted, specifying a reference volume, on which the parent virtual machine is mounted to be used for replication and synchronization, and accessing a point in time snapshot of the reference volume, on which the parent virtual machine is mounted. The method further includes coordinating with a secondary site to obtain an image of the reference volume, on which the parent virtual machine is mounted, at said point in time, and copying the common regions from a reference volume to a new volume on the secondary site. The differences between the reference volume and the new volume are transmitted from a primary site to a secondary site. The differences are then applied to the new volume to synchronize the child virtual machine on the secondary site to the child virtual machine on the primary site, wherein the child virtual machine and the parent virtual machine may be in different replicated volume groups.

In one embodiment the present invention is implemented as computer system having a processor coupled to a computer readable storage media and executing computer readable code. The computer readable code causes the computer system initiate a replication and synchronization operation between a reference volume, on which a parent virtual machine is mounted and a new volume, on which child virtual machine is mounted, specify a reference volume, on which the parent virtual machine is mounted to be used for replication and synchronization, and access a point in time snapshot of the reference volume, on which the parent virtual machine is mounted. The computer system also coordinates with a secondary site to obtain an image of the reference volume, on which the parent virtual machine is mounted, at said point in time, and copies the common regions from a reference volume to a new volume on the secondary site. The differences between the reference volume and the new volume are transmitted from a primary site to a secondary site. The differences are then applied to the new volume to synchronize the child virtual machine on the secondary site to the child virtual machine on the primary site, wherein the child virtual machine and the parent virtual machine may be in different replicated volume groups.

In one embodiment, metadata is used to identify the set of data objects from the replication source that have been modified, and wherein the metadata comprises changed block address ranges.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
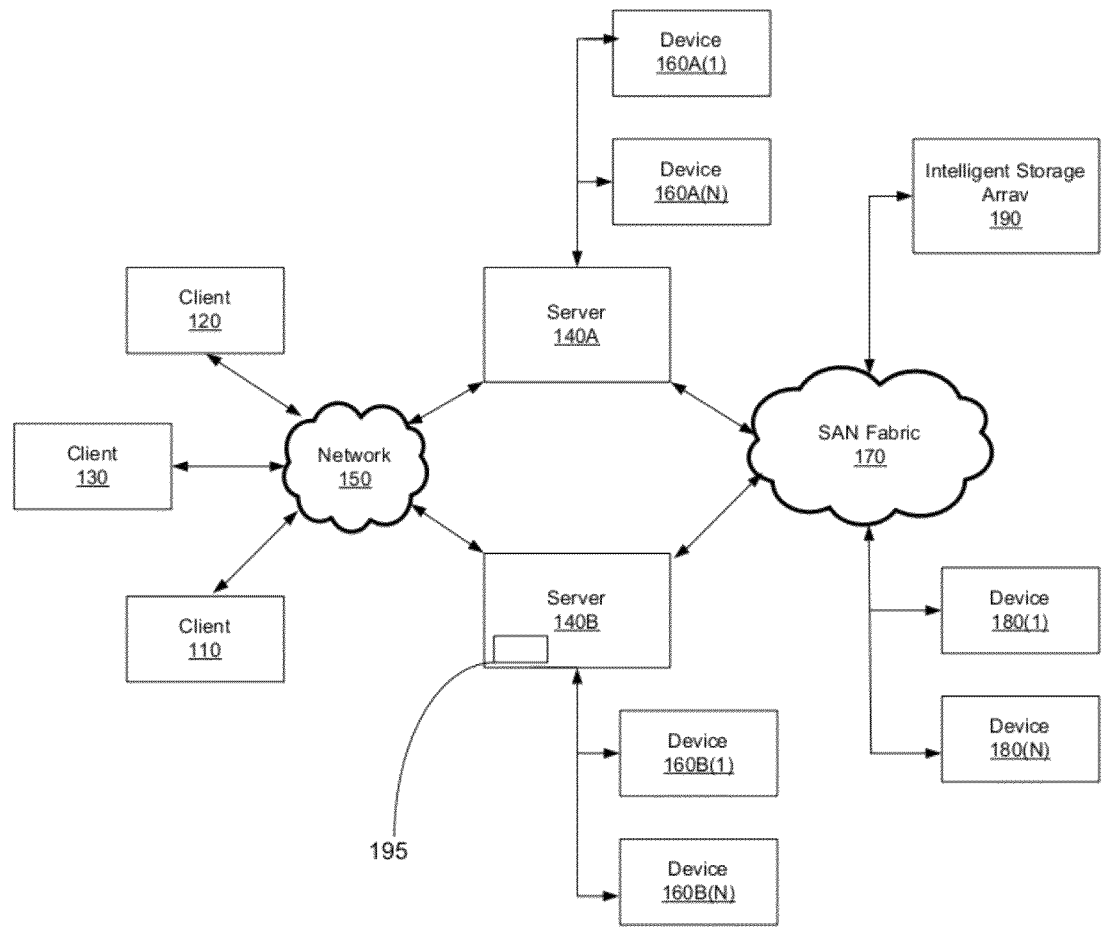
FIG. 1 shows a block diagram of an exemplary distributed computer system environment in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention advantageously take advantage of the fact that a child group of virtual machines cloned from a parent group of virtual machines will have substantial common data between the two. In a virtual volume replication employment scenario, if a group of parent virtual machines is already replicated to a same secondary site then the data comprising the replicated parent virtual machines can be used as reference volume for an initial synchronization in the event of a failover. This attribute even if the parent group of virtual machines and the child group of virtual machines may belong to separate replication volume groups. Embodiments of the present invention advantageously ship the blocks that differ, as opposed to shipping all the blocks, thereby reducing the amount of data that will have to be transported over the network to the remote site during initial synchronization. Embodiments of the present invention and their other features and advantages are further described below.

FIG. 1 is a block diagram depicting a network architecture 100 in which client systems 110, 120 and 130, as well as storage servers 140A and 140B (e.g., it will and any of which can be implemented using computer system 200), are coupled to a network 150 in accordance with one embodiment of the present invention. A storage server 140A is further depicted as having storage devices 160A(1)-(N) directly attached, and storage server 140B is depicted with storage devices 160B(1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. SAN fabric 170 also supports access to a storage array 190, which is also shown as an example of a specific storage device. Certain functionality of embodiments of the present invention are implemented via a synchronization agent 195, which is shown as instantiated on the server 140B.

Client computer systems 110, 120 and 130 are communicatively coupled via the network 150. Client systems 110, 120 and 130 are able to access information on data server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or storage array 190. Additionally, FIG. 1 depicts the use of a network such as the Internet for exchanging data, but the present disclosure is not limited to the Internet or any particular network-based environment. It should be noted that although two data server nodes 140A and 140B are shown, embodiments of the present invention can function with highly scalable distributed computer systems having hundreds of nodes, or more (e.g., cloud computing system, etc.).

Figure 2:
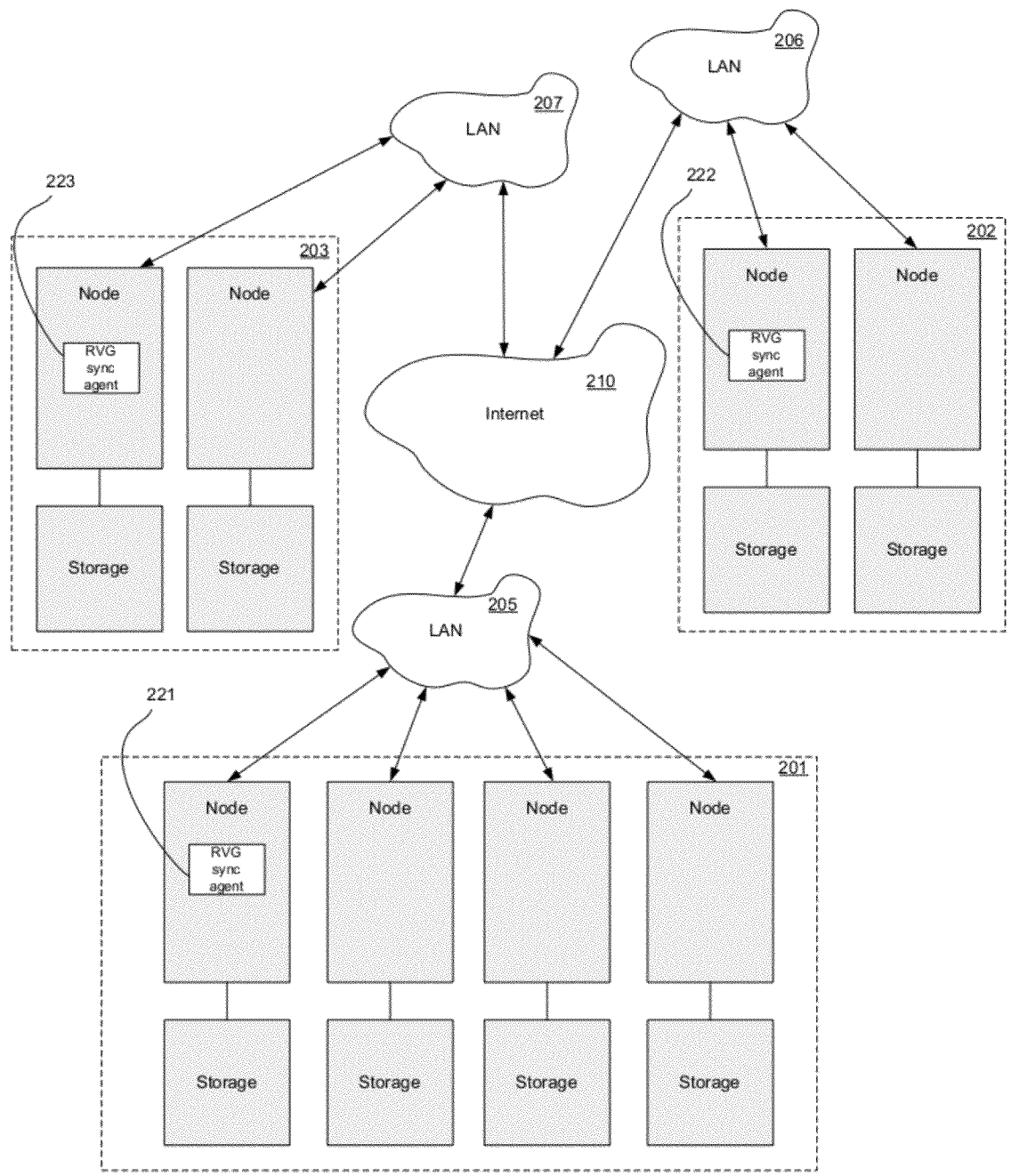
FIG. 2 shows a diagram depicting a high availability multi-cluster-based computing system in accordance with one embodiment of the present invention.

FIG. 2 shows a diagram depicting a high availability multi-cluster-based computing system in accordance with one embodiment of the present invention. As illustrated in FIG. 2, three clusters 201-203 are shown. The clusters 202-203 each comprise a two node cluster. Cluster 201 comprises a four node cluster. Each of the constituent nodes is shown connected to a respective storage device (e.g., disk drive, etc.). The nodes of each cluster communicate with one another via local area networks 205-207. These local area networks are in turn connected to the Internet 210. Although the embodiments described in the context of clusters of two nodes and four nodes, it should be appreciated that embodiments of the present invention can readily scale and function in distributed computer systems and/or cloud based computer systems having hundreds or thousands of nodes.

Thus, FIG. 2 shows the basic layout of a typical high-availability multi-cluster computer system environment. As described above, a high availability cluster is a computer cluster that functions primarily by providing high availability of services to users and/or applications. The multiple redundant nodes of each cluster 201-203 are used to provide service in case one or more nodes of a cluster should fail. For example, if a node with a particular application crashes, the application will be unavailable until the node is recovered. HA clustering implements a fail over of the particular application to one of the redundant nodes of the cluster.

FIG. 2 also shows the inclusion of a plurality of synchronization agents 221-223 in each of the clusters 201-203. The synchronization agents 221-223 implement the systematic and efficient replication volume group initial synchronization functionality upon the occurrence of a cluster failure, node failure, or migration in accordance with embodiments of the present invention. In addition to failing over one or more nodes to a redundant node within a cluster, embodiments of the present invention utilize redundant clusters to provide failover support to a failed cluster. Embodiments of the present invention enable the detection of a failed or migrated node or cluster, and support the smooth failover of applications and replication volume groups to an adoptive one or more redundant nodes or clusters. In the FIG. 2 embodiment, there exists at least one synchronization agent instantiated in each cluster, however, to provide redundancy, reliability, and the like, synchronization agents can be instantiated on each node of a given cluster.

Figure 3:
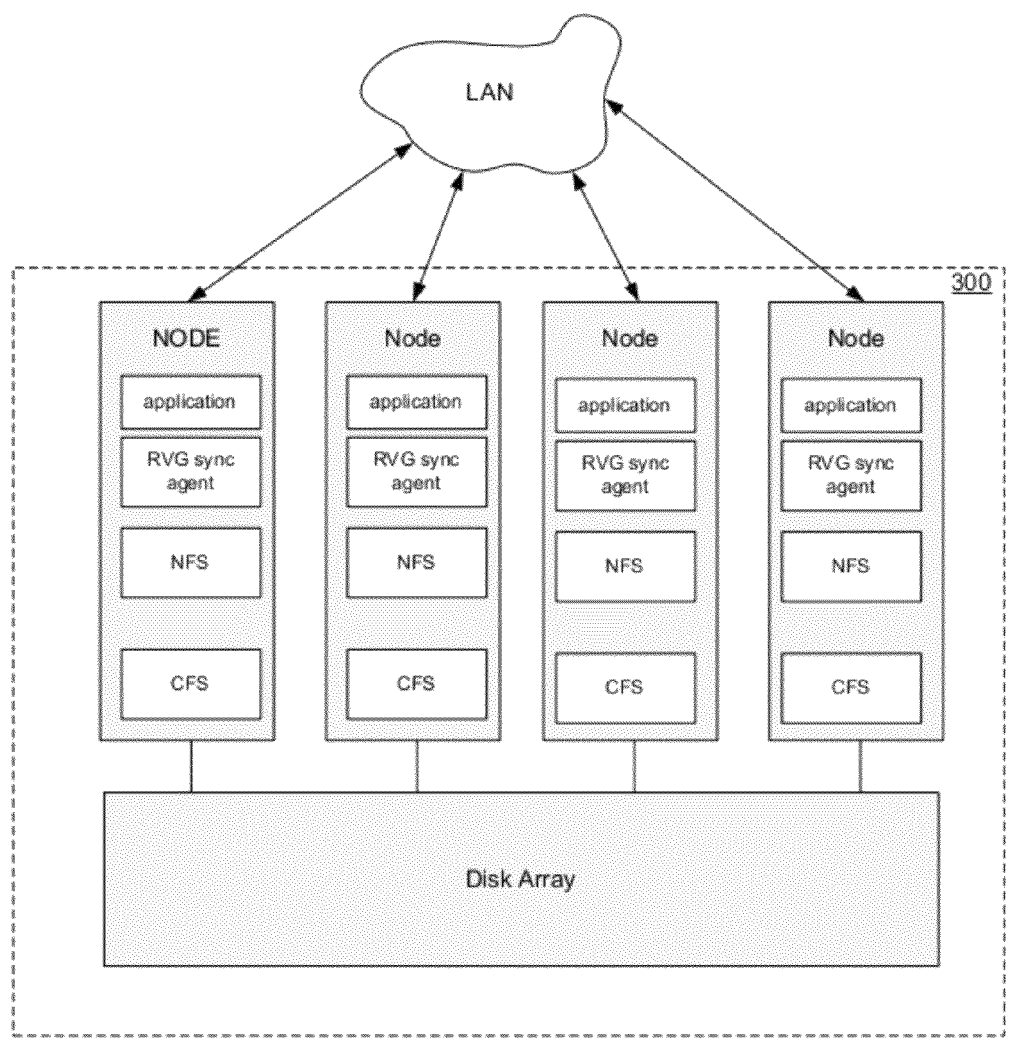
FIG. 3 shows also shows the communications pathways between the nodes of an exemplary cluster in accordance with one embodiment of the present invention.

FIG. 3 shows also shows the communications pathways between the nodes of an exemplary cluster 300 in accordance with one embodiment of the present invention. In one embodiment, this communication is IP based communication (e.g., TCP/IP communication and addresses). As described above, a exemplary cloud based distributed computing system typically consists of multiple clusters of computing nodes which communicate with each other in order to facilitate processing of the computation tasks. Within a given cluster, at the time of failure of one node, the other nodes in the cluster take over, or adopt, the tasks that were assigned to the failed node prior to the failure. For example, one of the nodes of the cluster 300 would adopt the applications and replication volume groups and the services of the failed node. A node can lose communication with other nodes of the cluster because of loss of network connectivity or because of the failure of that node.

The high availability and disaster recovery solutions typically rely on an inquiry protocol to distinguish between a temporary network outage and the actual node failure. If there is a loss of communication between a node and other nodes of the cluster, then each of the other nodes (e.g., if they are alive) send an inquiry request messages to other nodes of the cluster which act as a "witnesses", in order to determine the health of the node with which the communication is lost.

For example, in one embodiment, upon receiving the inquiry request message, the inquired nodes or witnesses check if they are able to communicate with the node for which the inquiry was made. Based on that, they send back affirmative or negative inquiry response to the node that sent the inquiry request message. Based on the inquiry responses from the inquired nodes, the inquiring node determines whether the communication loss is because of a temporary network outage or node failure.

With respect to virtual machines and volumes, it should be noted that the file in which the virtual machine operating system data is present is mounted on a volume (e.g., the data of the virtual machine is stored on a volume). During replication, data that is stored on a volume is replicated (or copied over network) to a remote secondary site. An RVG is a Replicated Volume Group, which is a set of volumes that are replicated from a primary site to a secondary site. Within a replicated volume group data consistency is maintained. Multiple replicated volume groups can be replicated from a primary site to the same secondary site.

With respect to parent virtual machines and child virtual machines, it should be noted that when a new virtual machine is cloned from an existing virtual machine, the new virtual machine is called the child virtual machine. The existing virtual machine from which the child virtual machine was created is referred to as a parent virtual machine. The data of the parent virtual machine is stored on a volume. The data of the Child virtual machine is typically stored on a separate volume. Since the child virtual machine is carved out from the Parent virtual machine, they share substantial data that is same (e.g., the data on the corresponding volumes will substantial data that is same).

In a case where volume on which the parent virtual machine is mounted, and is already replicated from a primary site to a secondary site. In this case, a new child virtual machine is created on the primary site from the parent virtual machine and is configured to be replicated from the primary site to the secondary site (e.g., a new volume on which the child virtual machine is present is configured to be replicated to the same secondary site). Conventional replication technology will replicate (e.g., over the network) the complete data on the new volume, on which the child virtual machine is mounted, to a volume on secondary site that will be the copy of the child virtual machine on the primary. Embodiments of the present invention, however, advantageously avoid generating such large amounts of network traffic by not sending the common data between the primary site and the secondary site during a synchronization.

Attributes of embodiments of the present invention enable the efficient provisioning of high-availability and disaster recovery functionality to the cloud based computing environment. To provide high availability disaster recovery functionality, embodiments of the present invention employ a replication of the newly created adoptive child virtual machine and transmits this replication to a remote site/cloud.

It should be noted that if the parent virtual machine has been previously replicated to the remote site, then it can be used as a reference volume for the synchronizations of the newly created child virtual machine. In this scenario, the synchronization data will be obtained from the parent virtual machine at the remote site. Thus, even though the newly created child virtual machine and the parent virtual machine at a remote site belong to separate application volume groups, their common data greatly reduces synchronization time and the amount of network traffic required.

Referring still to the FIG. 3 embodiment, it should be noted that each of the nodes of cluster 300 are also shown including a CFS component. CFS refers to a cluster file system which, in one embodiment, can be version of VxFS. A fundamental property of CFS is that it allows concurrent read/write access to a shared storage component (e.g., LUN, etc.) in a cluster environment. Additionally, CFS also implements much of the high availability functionality for user applications. For example, upon the occurrence of node failure, the NFS and CFS will continue to provide services on other nodes. CFS will keep on providing services as cluster nodes join or leave the cluster. A reconfiguration in CFS occurs when the membership set of the cluster changes. The membership set changes when one or more nodes joins or leaves the cluster.

As a part of reconfiguration, CFS takes certain actions when a node joins or leaves the cluster.

NFS is a type of distributed file system based on client/server model, that allows NFS servers to give access to their file systems to NFS client over the network. Systems having NFS clients can access/modify data on a remote system (e.g., which is an NFS server) as if they were accessing/modifying data on their own local storage.

Figure 4:
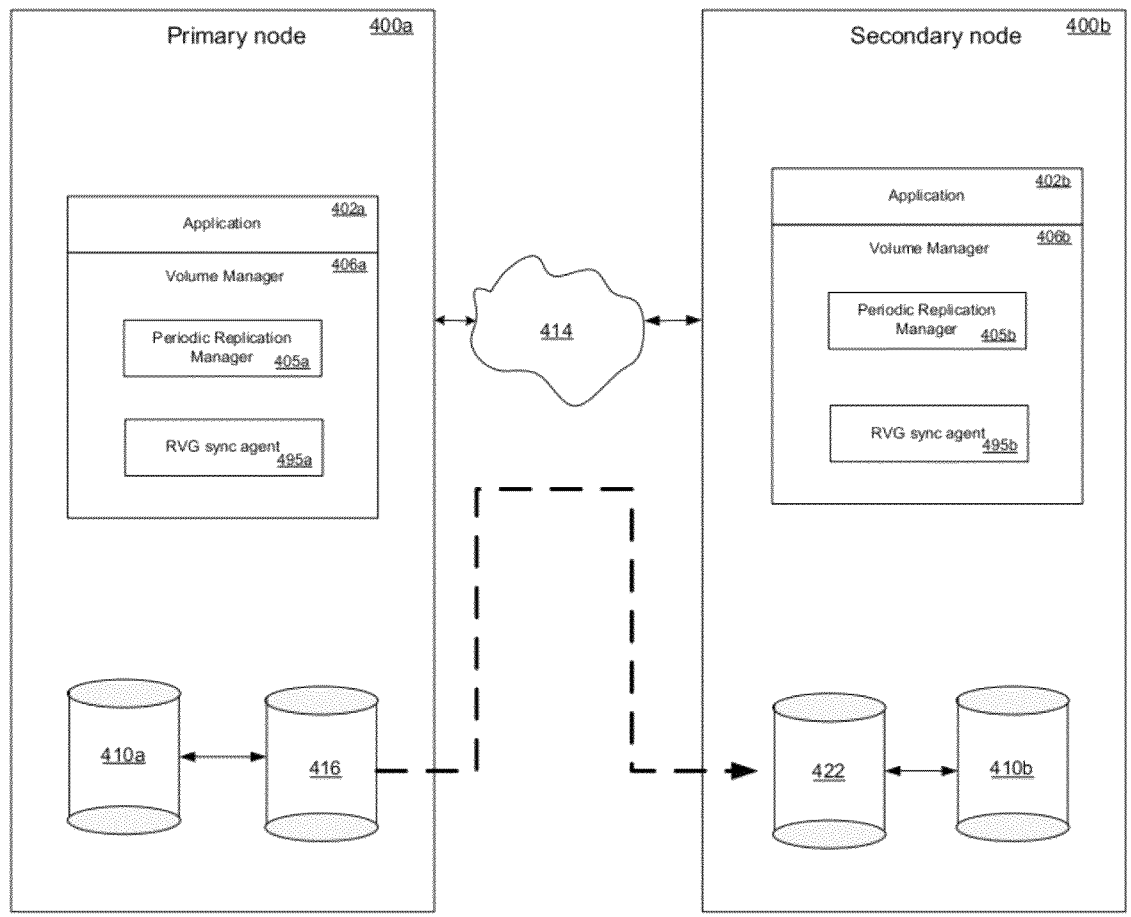
FIG. 4 illustrates an exemplary replication operation within an exemplary replication system environment according to one embodiment of the present invention.

FIG. 4 illustrates an exemplary replication operation within an exemplary replication system environment according to one embodiment of the present invention. In the illustrated embodiment, copies of incrementally modified or changed data of a primary volume (v) on which a primary file system is mounted within primary node 400a are transferred to a replicated secondary volume (vr) on which a secondary file system is mounted" within a secondary node 400b periodically.

In the replication system of the illustrated embodiment, a primary node 400a is coupled to a secondary node 400b via a network 414 (e.g., an IP network, LAN, WAN, or other communication link). Primary node 400a and secondary node 400b of the illustrated embodiment each respectively includes an application 402, a volume manager 406 and a periodic replication manager 405 as shown. In one embodiment, the functionality for managing the creation of snapshots and the mounting of applications on partially replicated snapshots is implemented by the periodic replication manager 405.

The FIG. 4 embodiment is initialized via the use of an initial synchronization. During the initial synchronization, the contents of a primary volume 410a within primary node 400a are transferred to a replicated secondary volume 410b within the secondary node 400b. Subsequently, the one or more applications continue running and updating their state data on the primary volume 410a.

At the later time, a point-in-time "snapshot" volume 416 is created. The snapshot volume 416 is then used to produce a replicated secondary volume 422 at the secondary node. The replicated secondary volume 422 would comprise an image of the parent group of virtual machines. This image will be used as the basis of a synchronization in the event of a failover, as described above.

It should be noted that although the volumes 410a, 410b, 416 and 422 are illustrated as residing within the enclosures of the primary node 400a and the secondary node 400b (e.g., disk drives, solid-state disks, or the like), the volumes can reside outside the enclosures and can be accessed via network and/or bus connections (e.g., Ethernet, fiber channel, etc.).

Figure 5:
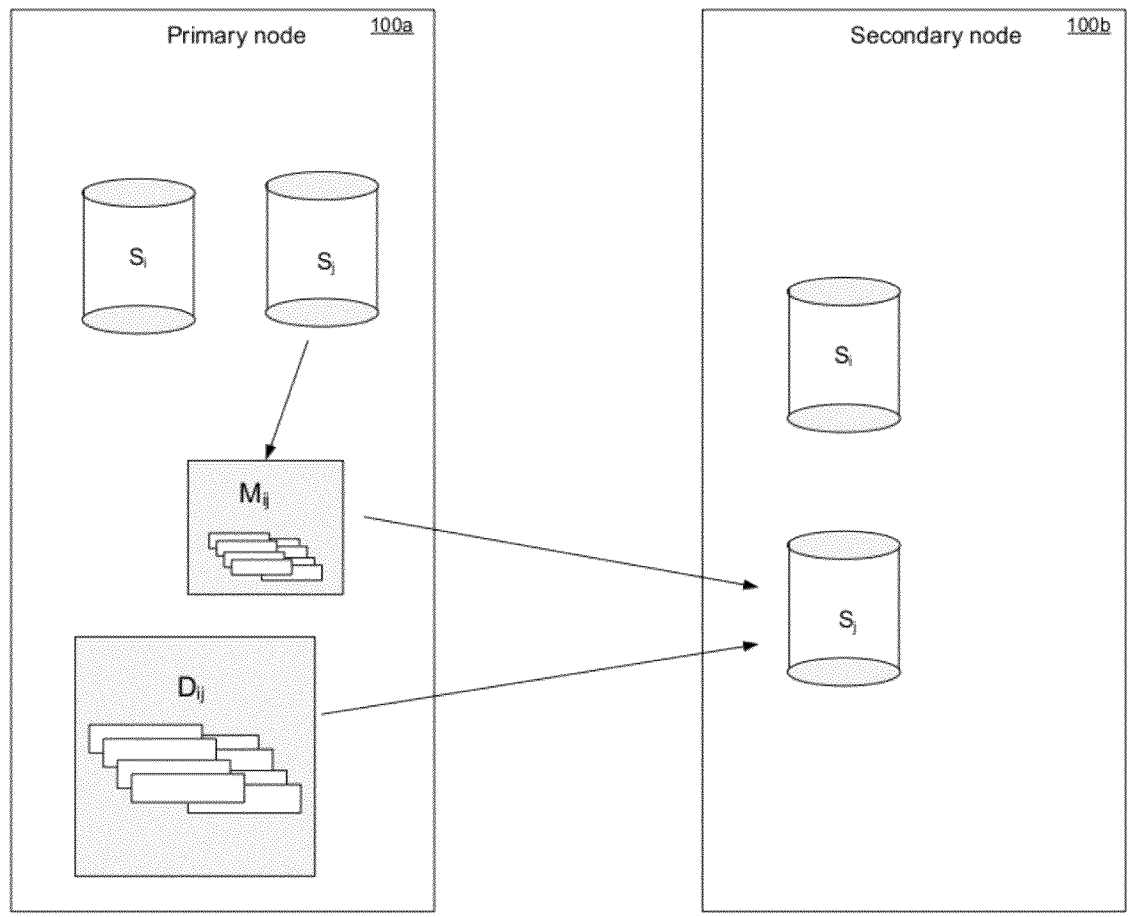
FIG. 5 shows a replication operation as implemented between the primary node (e.g., at the primary site) and the secondary node (e.g., at the secondary site) in accordance with one embodiment of the present invention.

FIG. 5 shows a replication operation as implemented between the primary node (e.g., at the primary site) and the secondary node (e.g., at the secondary site) in accordance with one embodiment of the present invention. In the FIG. 5 embodiment, $s_i$ and $s_j$ are the snapshots taken at time $t_i$ and $t_j$, respectively, and $M_{ij}$ is the set of block addresses whose blocks are updated between time $t_i$ and $t_j$, where j>i. $D_{ij}$ be the set of data blocks (i.e., the content) referred by $M_{ij}$. $M_{ij}$ can be derived from $D_{ij}$. For example, $D_{ij}$ can be implemented as a stream of change records each of which contains an address, length, and data field whereas $M_{ij}$ can be stream of change records each of which contains an address and length field. Both $M_{ij}$ and $D_{ij}$ can comprise the changed data blocks between s2 at the primary node 500a and s2 at the secondary node 500b.

Figure 6:
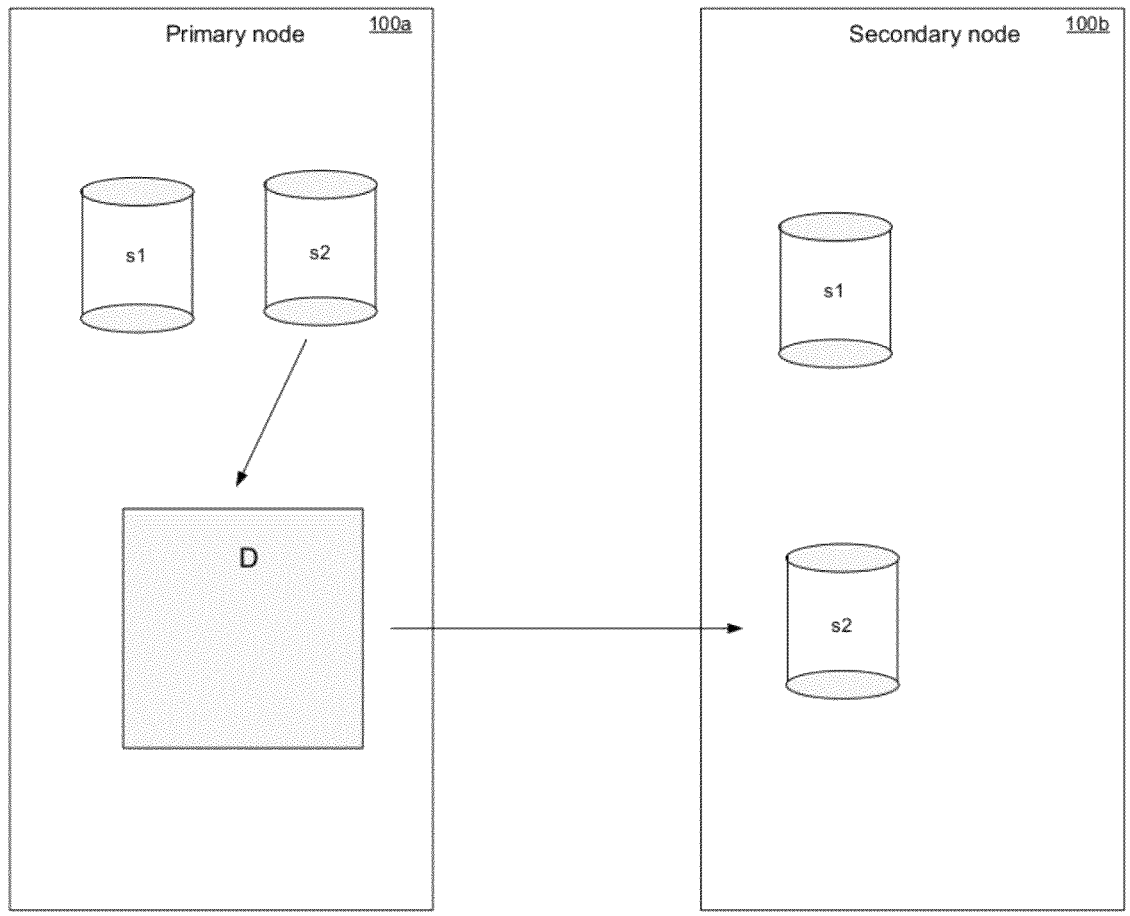
FIG. 6 shows a diagram depicting a synchronization operation as implemented between the primary node and the secondary node in accordance with one embodiment of the present invention.

FIG. 6 shows a diagram depicting a synchronization operation as implemented between the primary node and the secondary node in accordance with one embodiment of the present invention. As depicted in FIG. 6, as the primary node undergoes a replication process to a secondary node, changed data blocks comprising D are being sent from the primary node to the secondary node.

Figure 7:
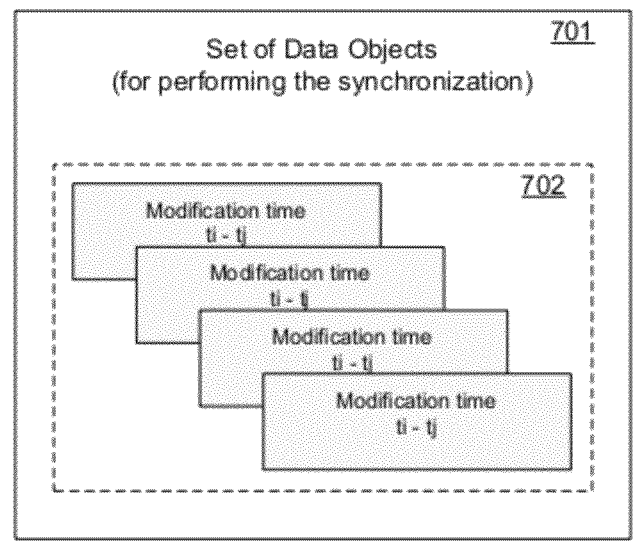
FIG. 7 shows a diagram of a set of data objects that comprise the data objects used to implement a full synchronization (e.g., $D_{ij}$) in accordance with one embodiment of the present invention.

FIG. 7 shows a diagram of a set of data objects 701 that comprise the data objects used to implement a full synchronization (e.g., $D_{ij}$) in accordance with one embodiment of the present invention. As described above, in an example where a snapshot $s_i$ is taken at time $t_i$ (e.g., a first-time) on a replication source, and another snapshot $s_j$ is taken at time $t_j$ (e.g., a subsequent second time), the difference between $t_j$ and $t_i$ is the period of replication. To perform a full synchronization of the snapshot $s_j$ on the secondary node, those data objects 702 that got modified between $t_i$ and $t_j$ need to be transferred from the primary node to the secondary node.

Figure 8:
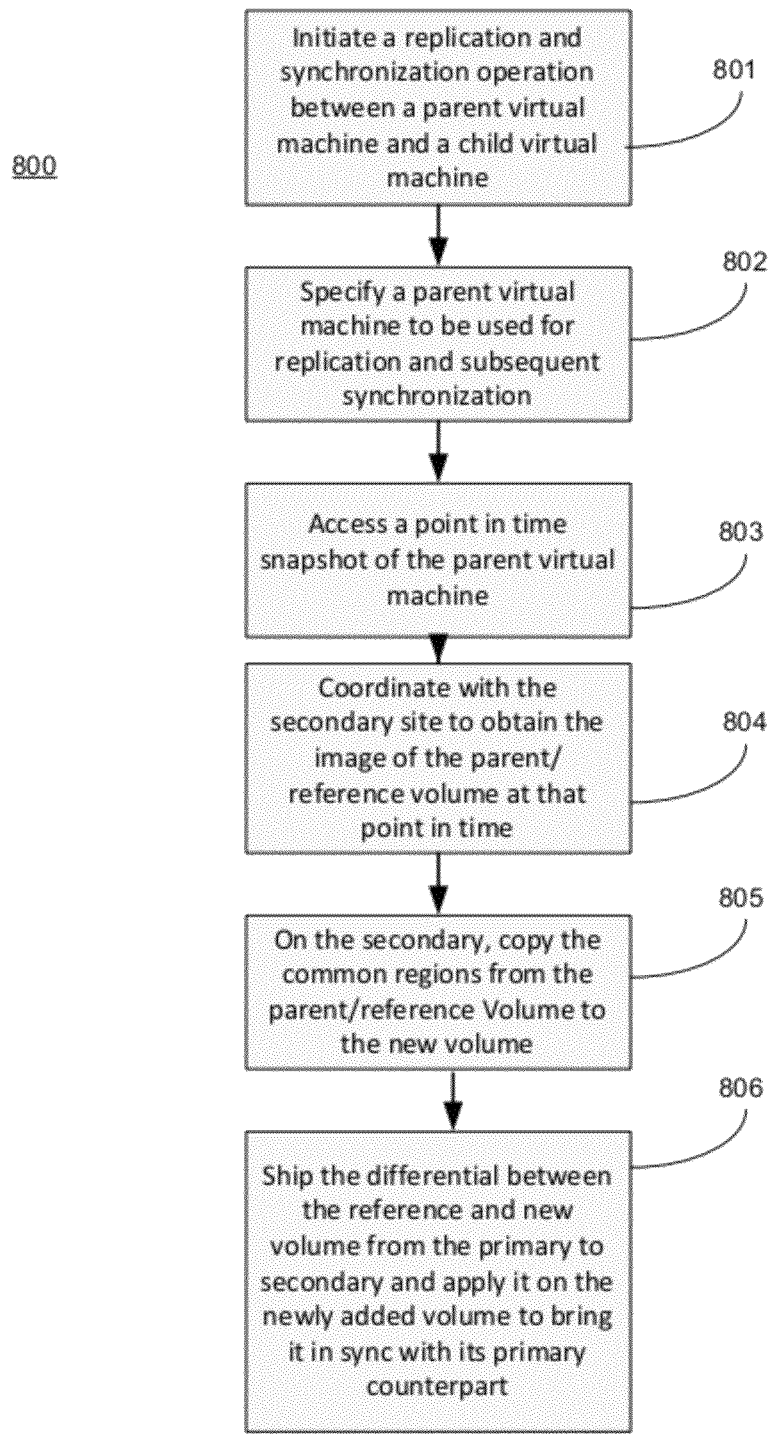
FIG. 8 shows a diagram of the steps of a replication and synchronization process in accordance with one embodiment of the present invention.

FIG. 8 shows a diagram of the steps of a replication and synchronization process 800 in accordance with one embodiment of the present invention.

Process 800 begins in step 801, where a replication and synchronization operation between a parent virtual machine and a child virtual machine is initiated. As described above, this initiation can be in response to a failover or migration, or alternatively, can be directed by a system administrator.

In step 802, a parent virtual machine is specified for use as a replication and subsequent synchronization target of the child virtual machine at the secondary node. For example, in one embodiment, when a user specifies a volume that has to be replicated, that user may provide a reference volume that is already present on the primary as well as remote secondary site for initial synchronization, even though the reference volume may belong to a separate replication volume group. The parent exists that both the primary site and the secondary site via, for example, a periodic replication process for HA/DA purposes.

In step 803, a point in time snapshot of the parent virtual machine is accessed. Using the point in time snapshot, the primary site identifies the blocks that are common at the point in time snapshot between the parent/reference volume and the new child volume. In one embodiment, a hash comparison is used to identify the common blocks. Thus, data regions that are same between the reference volume and new volume, are identified on the primary. Since the reference volume is already present on the secondary site the common data regions will not be transferred to the secondary over network, thus saving substantial network bandwidth and synchronization time. This common data is copied from the reference volume on the secondary to the new volume on the secondary site.

In step 804, the synchronization agent coordinates with the secondary site to get the image of the parent/reference volume at that point in time.

In step 805, on the secondary site, a synchronization agent copies the common regions from the parent/reference volume to the new volume. As described above, since the reference volume is already present on the secondary site the common data regions will not be transferred to the secondary over network, thus saving substantial network bandwidth and synchronization time. This common data is copied from the reference volume on the secondary to the new volume on the secondary site.

Subsequently, in step 806, the differential between the reference volume and new volume are transmitted from the primary site to secondary site and applied to the newly added volume to bring the child virtual machine into synchronization with its child virtual machine counterpart on the primary site. This will bring the data on the new volume on the primary and data on the new volume on the secondary in sync. The child virtual machine is mounted on the new volume on the primary as well as secondary, and hence the child virtual machines between the two sites will be in sync. Thus process 800 has replicated the child virtual machine on the primary to the secondary and saved network bandwidth.

It should be noted that in an exemplary cloud environment where the number of virtual machines could be very large, embodiments of the present invention would save substantial initial synchronizations time and network bandwidth. This could also be applicable to data that initially started from the same snapshot image, complete separate copies were created and then bifurcated. They may also have significant data that is common and hence if one image is provided as a reference of other, then the user can save the initial synchronization time.

Figure 9:
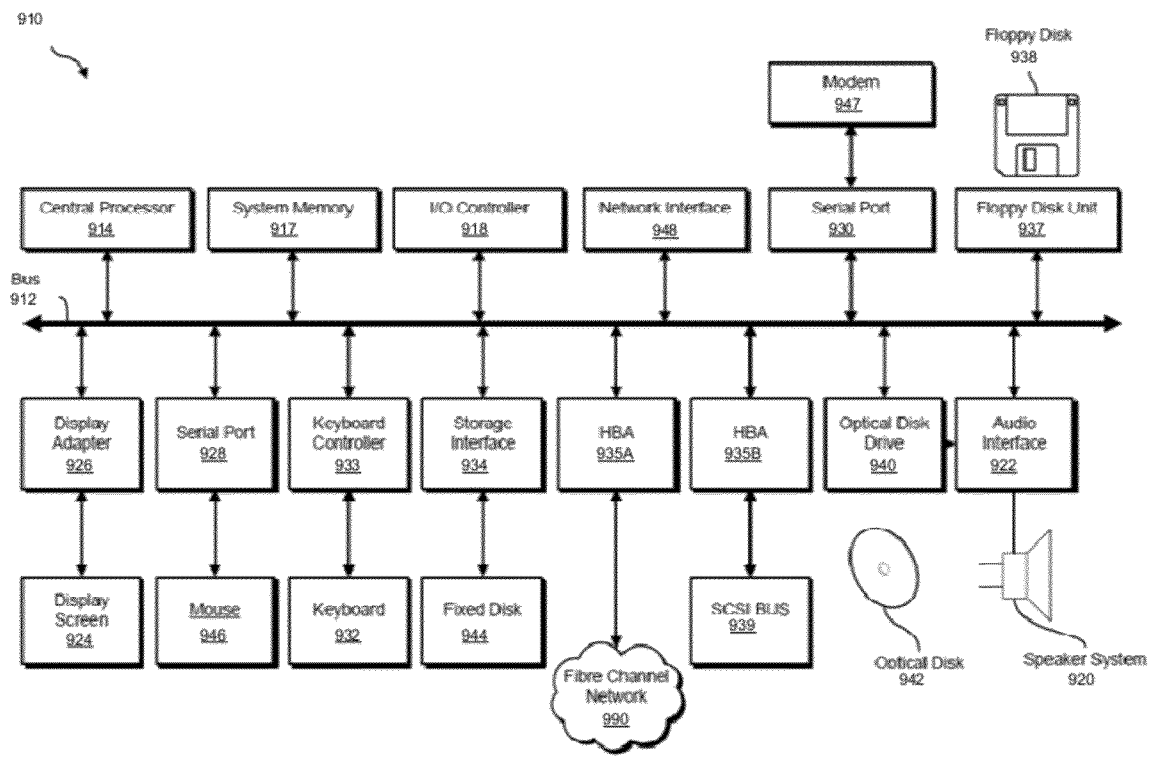
FIG. 9 depicts a block diagram of a computer system suitable for implementing certain functionality in accordance with one embodiment of the present invention.

FIG. 9 depicts a block diagram of a computer system 910 suitable for implementing certain functionality in accordance with one embodiment of the present invention. Computer system 810 includes a bus 912 which interconnects major subsystems of computer system 910, such as a central processor 914, a system memory 917 (typically RAM, but which may also include ROM, flash RAM, or the like), an input/output controller 818, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fiber Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. In the FIG. 9 embodiment, the system memory 917 instantiates a replication manager module 950 which implements the continuous replication functionality described above. The ROM or flash memory can contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. The operation of a computer system such as that shown in FIG. 9 is readily known in the art and is not discussed in detail in this application. Code to implement the present disclosure can be stored in computer-readable storage media such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
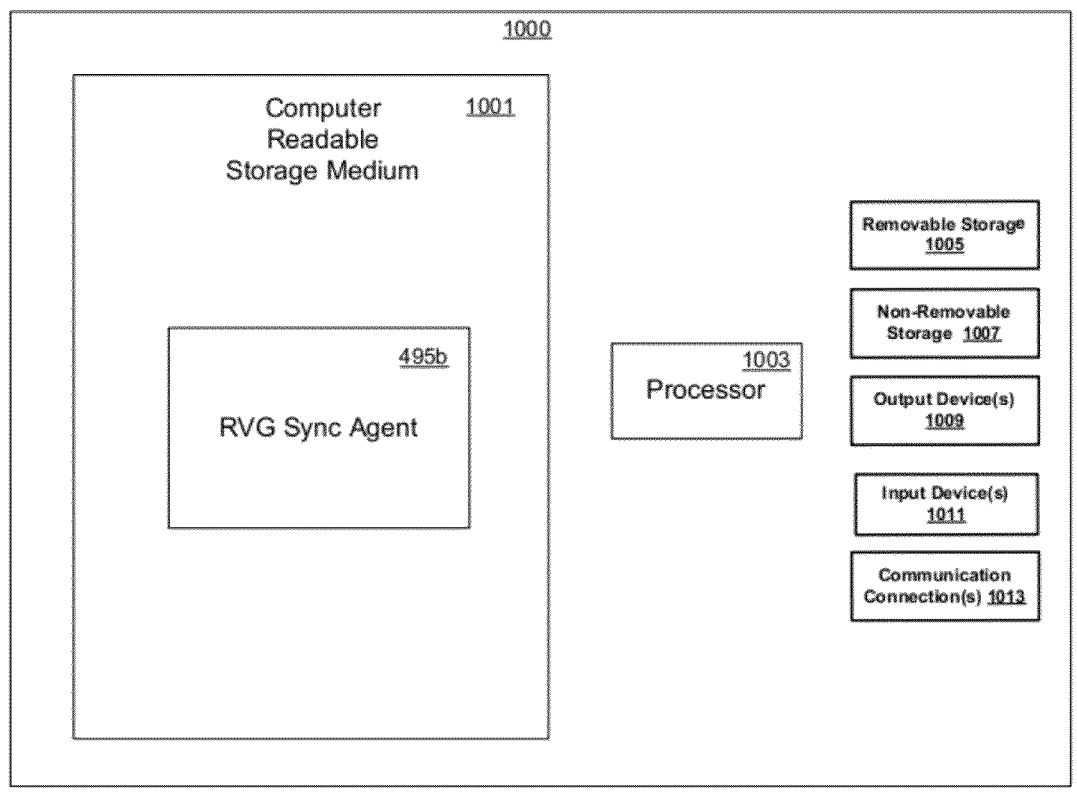
FIG. 10 shows an exemplary computer system 1000 according to one embodiment.

FIG. 10 shows an exemplary computer system 1000 according to one embodiment. Computer system 1000 depicts the components of a basic computer system providing the execution environment for certain hardware-based and software-based functionality for the above described embodiments. For example, computer system 1000 can be a system upon which the one or more software agents (e.g., synchronization agent 495b from FIG. 4) are instantiated. Computer system 1000 can be implemented as, for example, a server computer system, workstation computer system, desktop computer system, or laptop computer system. Similarly, computer system 1000 can be implemented as a handheld device. Computer system 1000 typically includes at least some form of computer readable media (e.g., computer readable storage medium 1001). Computer readable media can be a number of different types of available media that can be accessed by computer system 1000 and can include, but is not limited to, computer storage media.

In its most basic configuration, computer system 1000 typically includes processing unit 1003 and memory 1001. Depending on the exact configuration and type of computer system 1000 that is used, memory 1001 can be volatile (e.g., such as DRAM, etc.) 1001a, non-volatile 1001b (e.g., such as ROM, flash memory, etc.) or some combination of the two. Similarly, the memory 1001 can comprise other devices besides solid-state devices, such as, for example, magnetic disk-based media, optical media, or the like.

Additionally, computer system 1000 can include other mass storage systems (e.g., removable 1005 and/or non-removable 1007) such as magnetic or optical disks or tape. Similarly, computer system 1000 can include input devices 1009 and/or output devices 1011 (e.g., such as a display). Computer system 1000 can further include network connections 1013 to other devices, computers, networks, servers, etc. using either wired or wireless media. As all of these devices are well known in the art, they need not be discussed in detail.

It should further be noted, that the computer system 1000 can have some, most, or all of its functionality supplanted by a distributed computer system having a large number of dispersed computing nodes, such as would be the case where the functionality of the computer system 1000 is partly or wholly executed using a cloud computing environment.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for using a reference volume for initial synchronization of a replicated volume, comprising:
    cloning a first new volume from a first reference volume at a primary site at a first time, wherein the first new volume and the first reference volume initially store identical content;
    initiating, at a second time after the first time, a replication and synchronization operation between the first reference volume on which a parent virtual machine is mounted at the primary site, and the first new volume on which a first child virtual machine is mounted at the primary site, wherein the child virtual machine and the parent virtual machine execute different instructions such that data stored on the first new volume diverges from data stored on the first reference volume after the first time;
    accessing a point in time snapshot of the first reference volume;
    coordinating with a secondary site to obtain a snapshot of a second reference volume at said point in time, wherein the second reference volume at the secondary site is an identical copy of the first reference volume at the primary site; and
    generating an initial backup of the first new volume at the secondary site using the point in time snapshot of the second reference volume, wherein generating an initial backup comprises:
        determining common regions between the first new volume stored at the primary site and the point in time snapshot of the first reference volume stored at the primary site;
        copying the common regions from the point in time snapshot of the second reference volume at the secondary site to a second new volume at the secondary site;
        transmitting differences between the point in time snapshot of the first reference volume and the first new volume from the primary site to the secondary site; and
        applying the differences to the second new volume at the secondary site to synchronize a second child virtual machine at the secondary site to the first child virtual machine at the primary site, wherein the first child virtual machine and the parent virtual machine are in different replicated volume groups, wherein the different replicated volume groups each comprise a set of volumes that are replicated from a primary site to a secondary site.

2. The method of claim 1, wherein a first cluster is executing at the primary site and a second cluster is executing at the secondary site.

3. The method of claim 1, wherein metadata is used to identify a set of data objects from the replication source that have been modified.

4. The method of claim 3, wherein the metadata comprises changed block address ranges between the first reference volume and the first new volume at the primary site.

5. The method of claim 1, wherein a hash process is used to identify common data objects between the point in time snapshot of the first reference volume and the first new volume.

6. The method of claim 1, wherein the first reference volume is part of a first replicated volume group and the first new volume is part of a second replicated volume group.

7. The method of claim 1, wherein the replication and synchronization operation is initiated when the first new volume is configured to be replicated to the secondary site where the first reference volume is already replicated.

8. A non-transitory computer readable storage medium having stored thereon, computer executable instructions that, if executed by a computer system cause the computer system to perform a method comprising:
   cloning a first new volume from a first reference volume at a primary site at a first time, wherein the first new volume and the first reference volume initially store identical content;
   initiating, at a second time after the first time, a replication and synchronization operation between the first reference volume on which a parent virtual machine is mounted at the primary site, and the first new volume on which a first child virtual machine is mounted at the primary site, wherein the child virtual machine and the parent virtual machine execute different instructions such that data stored on the first new volume diverges from data stored on the first reference volume after the first time;
   accessing a point in time snapshot of the first reference volume;
   coordinating with a secondary site to obtain a snapshot of a second reference volume at said point in time, wherein the second reference volume at the secondary site is an identical copy of the first reference volume at the primary site; and
   generating an initial backup of the first new volume at the secondary site using the point in time snapshot of the second reference volume, wherein generating an initial backup comprises:
      determining common regions between the first new volume stored at the primary site and the point in time snapshot of the first reference volume stored at the primary site;
      copying the common regions from the point in time snapshot of the second reference volume at the secondary site to a second new volume at the secondary site;
      transmitting differences between the point in time snapshot of the first reference volume and the first new volume from the primary site to the secondary site; and
      applying the differences to the second new volume at the secondary site to synchronize a second child virtual machine at the secondary site to the first child virtual machine at the primary site,
   wherein the first child virtual machine and the parent virtual machine are in different replicated volume groups, wherein the different replicated volume groups each comprise a set of volumes that are replicated from a primary site to a secondary site.

9. The non-transitory computer readable storage medium of claim 8, wherein a first cluster is executing at the primary site and a second cluster is executing at the secondary site.

10. The non-transitory computer readable storage medium of claim 8, wherein metadata is used to identify a set of data objects from the replication source that have been modified.

11. The non-transitory computer readable storage medium of claim 10, wherein the metadata comprises changed block address ranges between the first reference volume and the first new volume at the primary site.

12. The non-transitory computer readable storage medium of claim 8, wherein a hash process is used to identify common data objects between the point in time snapshot of the first reference volume and the first new volume.

13. The non-transitory computer readable storage medium of claim 8, wherein the first reference volume is part of a first replicated volume group and the first new volume is part of a second replicated volume group.

14. The non-transitory computer readable storage medium of claim 1, wherein the replication and synchronization operation is initiated when the first new volume is configured to be replicated to the secondary site where the first reference volume is already replicated.

15. A computer system, comprising:
   a computer system having a processor coupled to a computer readable storage media and executing computer readable code which causes the computer system to:
      clone a first new volume from a first reference volume at a primary site at a first time, wherein the first new volume and the first reference volume initially store identical content;
      initiate, at a second time after the first time, a replication and synchronization operation between the first reference volume on which a parent virtual machine is mounted at the primary site, and the first new volume on which a first child virtual machine is mounted at the primary site, wherein the child virtual machine and the parent virtual machine execute different instructions such that data stored on the first new volume diverges from data stored on the first reference volume after the first time;
      access a point in time snapshot of the first reference volume;
      coordinate with a secondary site to obtain a snapshot of a second reference volume at said point in time, wherein the second reference volume at the secondary site is an identical copy of the first reference volume at the primary site; and
      generate an initial backup of the first new volume at the secondary site using the point in time snapshot of the second reference volume, wherein generating an initial backup comprises:
         determine common regions between the first new volume stored at the primary site and the point in time snapshot of the first reference volume stored at the primary site;
         copy the common regions from the point in time snapshot of the second reference volume at the secondary site to a second new volume at the secondary site;

transmit differences between the point in time snapshot of the first reference volume and the first new volume from the primary site to the secondary site; and apply the differences to the second new volume at the secondary site to synchronize a second child virtual machine at the secondary site to the first child virtual machine at the primary site, wherein the first child virtual machine and the parent virtual machine are in different replicated volume groups, wherein the different replicated volume groups each comprise a set of volumes that are replicated from a primary site to a secondary site.

16. The computer system of claim 15, wherein a first cluster is executing at the primary site and a second cluster is executing at the secondary site.

17. The computer system of claim 15, wherein metadata is used to identify a set of data objects from the replication source that have been modified, and wherein the metadata comprises changed block address ranges.

18. The computer system of claim 15, wherein a hash process is used to identify common data objects between the point in time snapshot of the first reference volume and the first new volume.

19. The computer system of claim 15, wherein the first reference volume is part of a first replicated volume group and the first new volume is part of a second replicated volume group.

20. The computer system of claim 15, wherein the replication and synchronization operation is initiated when the first new volume is configured to be replicated to the secondary site where the first reference volume is already replicated.

* * * * *